United States Patent
Sung

(10) Patent No.: US 12,034,839 B2
(45) Date of Patent: Jul. 9, 2024

(54) MULTI-PARTY SESSION KEY AGREEMENT METHOD

(71) Applicant: The Industry & Academic Cooperation in Chungnam National University (IAC), Daejeon (KR)

(72) Inventor: Soonhwa Sung, Daejeon (KR)

(73) Assignee: THE INDUSTRY & ACADEMIC COOPERATION IN CHUNGNAM NATIONAL UNIVERSITY (IAC), Daejeon (KR)

(*) Notice: Subject to any disclaimer, the term of this patent is extended or adjusted under 35 U.S.C. 154(b) by 143 days.

(21) Appl. No.: 17/893,743

(22) Filed: Aug. 23, 2022

(65) Prior Publication Data

US 2023/0370250 A1 Nov. 16, 2023

(30) Foreign Application Priority Data

May 16, 2022 (KR) .................. 10-2022-0059493

(51) Int. Cl.
*H04L 9/08* (2006.01)
(52) U.S. Cl.
CPC .......... *H04L 9/0833* (2013.01); *H04L 9/0838* (2013.01)
(58) Field of Classification Search
CPC ... H04L 9/0833; H04L 9/0838; H04L 9/0841; H04L 9/50; H04L 2209/46; H04L 2209/56; H04L 63/061
See application file for complete search history.

(56) References Cited

U.S. PATENT DOCUMENTS

| | | | |
|---|---|---|---|
| 2015/0326512 A1* | 11/2015 | Chiu | H04L 67/55 726/7 |
| 2020/0084018 A1* | 3/2020 | Pande | H04L 9/0844 |
| 2020/0252211 A1* | 8/2020 | Chen | H04L 9/0894 |
| 2020/0290567 A1* | 9/2020 | Funyak | B60R 25/102 |
| 2023/0284027 A1* | 9/2023 | Wang | H04W 12/0431 455/410 |

FOREIGN PATENT DOCUMENTS

| | | | | |
|---|---|---|---|---|
| CN | 101908961 A | * | 12/2010 | |
| CN | 113162765 A | * | 4/2021 | ........... H04L 9/0838 |
| KR | 10-2007-0067588 A | | 6/2007 | |

(Continued)

OTHER PUBLICATIONS

Yanjiang Yang et al., "Computationally Secure Hierarchical Self-healing Key Distribution for Heterogeneous Wireless Sensor Networks", ICICS 2009, LNCS 5927, Dec. 2009, pp. 135-149.

(Continued)

*Primary Examiner* — Dereena T Cattungal
(74) *Attorney, Agent, or Firm* — Paratus Law Group, PLLC

(57) ABSTRACT

A multi-party session key agreement method includes: a test session for exchanging a short-term key between parties of 3 to n peers; and an original session for exchanging a long-term key between the parties who have exchanged the short-term key. Peer (n) that has conducted the test session and the original session has cluster (n) that manages the keys as a result of conducting the sessions, and cluster (n) agrees with a result of the session conducted in peer (n) by communicating with cluster (n+1) of another peer (n+1).

6 Claims, 4 Drawing Sheets

(56) References Cited

FOREIGN PATENT DOCUMENTS

| | | |
|---|---|---|
| KR | 10-1070473 B1 | 10/2011 |
| KR | 10-2021-0045326 A | 4/2021 |
| KR | 10-2314379 B1 | 10/2021 |
| WO | WO 2007-059378 A2 | 5/2007 |

OTHER PUBLICATIONS

Qiuhua Wang et al., "Access-polynomial-based self-healing group key distribution scheme for resource-constrained wireless networks", Security and Communication Networks, Feb. 15, 2012, pp. 1363-1374.

Huifang Chen et al., "Improved One-Way Hash Chain and Revocation Polynomial-Based Self-Healing Group Key Distribution Schemes in Resource-Constrained Wireless Networks", Sensors 2014, Dec. 18, 2014, pp. 24358-24380.

Mike Just et al., "Authenticated Multi-Party Key Agreement", International Conference on the Theory and Application of Cryptology and Information Security, Advances in Cryptology—ASIACRYPT 1996, Dec. 1997, pp. 1-15.

Emmanuel Bresson et al., "Provably Authenticated Group Diffie-Hellman Key Exchange", Proceedings of the 8th ACM Conference on Computer and Communications Security, Nov. 5-8, 2001, pp. 255-264.

David Pointcheval et al., "Security Arguments for Digital Signatures and Blind Signatures", Journal of Cryptology, 2000, pp. 361-396, vol. 13, No. 3.

Asli Bay et al., "Practical Multi-Party Private Set Intersection Protocols", IEEE Transactions on Information Forensics and Security, 2021, pp. 1-15, vol. 17.

Open Source, OverSim The Overlay Simulation Framework, Feb. 2013, p. 1, www.oversim.org.

Korean Office Action for related KR Application No. 10-2022-0059493 mailed Aug. 30, 2023 from Korean Intellectual Property Office.

* cited by examiner

MULTI-PARTY SESSION KEY AGREEMENT METHOD

CROSS-REFERENCE TO PRIOR APPLICATION

This application claims priority to Korean Patent Application No. 10-2022-0059493 (filed on May 16, 2022), which is hereby incorporated by reference in its entirety.

BACKGROUND

The present invention relates to a multi-party session key agreement method of a session key for enhancing security of network communication, the method having excellent economic efficiency, as well as complete forward secrecy.

Unlike the existing client/server concept, the peer-to-peer (P2P) technology has a characteristic in that PCs are connected and share resources, and all participants act as both a server and a client at the same time. When peers existing in a physical network register in a P2P service, a P2P overlay network, which is a virtual network between the registered peers, is created. In the P2P overlay network, peers may share and exchange information directly with other peers without the help of a server. This P2P concept means direct 1:1 connection of humans, as well as simple connection of computers.

A blockchain is a ledger management technique based on distributed computing technology that stores management target data in a distributed data storage environment based on a chain-type connection ring, in which small data called 'blocks' are created based on a P2P method, so that no one can arbitrarily modify the data, and anyone may view results of change in the data.

Due to the advantages such as enhanced security, transaction integrity, cost reduction, increased transaction speed, and the like, the blockchain has innovative potential capable of changing industries in various fields, such as functioning as a technical foundation of cryptocurrencies including bitcoin.

On the other hand, security of a blockchain system is a very important factor for utilization of the blockchain in various ways, i.e., for participation of many potential users. However, with all the various functional advantages described above, security risks related to the blockchain technology are emphasized. For example, although cryptocurrency itself is almost impossible to hack as it is based on a blockchain, there is a risk of key theft when a user is connected to a network to make a transaction, since a key capable of accessing an account (owner's personal ID and password, or the like) is stored in a wallet that stores digital keys for proving ownership of the cryptocurrency and validity of the transaction.

Korean Laid-Opened Patent No. 2021-0045326 (Key Management Mechanism for Cryptocurrency Wallet) is for safe management of keys related to cryptocurrency transactions in a cryptocurrency exchange, and a method of managing keys using an encrypted private key stored in a first database and a decryption key of the encrypted private key stored in a second database is proposed. However, since this management method is a management conducted by a central management server (cryptocurrency exchange server) and is not a management method based on a multilateral protocol, it may be vulnerable to intensive collusion attacks.

Although Korea Patent Registration No. 2314379 (cryptocurrency wallet security) relates to a security method of a cryptocurrency wallet, which encrypts and stores mnemonics in a specific memory, and decrypts the mnemonics only when it is needed, and this also is not a management method based on a multilateral protocol, nor a security through a key protocol.

In the case of commercial contents used for distributed application programs in an Internet environment, a self-recovery key mechanism is useful for protecting highly sensitive data. However, the recovery key mechanism may not recover a session key with only one user's security. Several studies, including non-patent document 1, have proposed that through the key mechanism, group users may recover a lost session key, and communication overheads may be reduced without additional increase in the storage cost. However, these studies show limitations in that a hash chain-based mechanism cannot resist collusion attacks. That is, when a revoked user competes with a newly joined user, it is not safe since the revoked user may recover all related session keys.

Non-patent document 2 proposes group key distribution including self-recovery characteristics in a wireless network with limited resources. However, it does not guarantee forward security and includes resistance to collusion attacks.

Non-patent document 3 proposes self-healing group key distribution based on unidirectional hash chains containing collusion resistance. In this study, distribution is divided into different groups according to the time when a user has joined a group, and a session key may be recovered from the last session in which a legitimate user has joined. However, this study mentions that forward secrecy may be violated since a revoked user can recover the private security of other legitimate users who can recover the session key of the current session.

(Patent Document 1) Korean Laid-Opened Patent No. 2021-0045326
(Patent Document 1) Korea Patent Registration No. 2314379

Non-Patent Documents (Non-patent Document 1) Y. Yang, J. Zhou, R. H. Deng, F. Bao, Computationally Secure Hierarchical Self-Healing Key Distribution for Heterogeneous Wireless Sensor Networks, in: Lecture Notes in Computer Science, 2009, pp. 135-149.
(Non-patent Document 2) Q. Wang, H. Chen, L. Xie, K. Wang, Access-polynomial-based self-healing group key distribution scheme for resource-constrained wireless networks, Secur. Commun. Netw. 5 (12) (2012) 1363-1374.
(Non-patent Document 3) H. Chen, L. Xie, Improved One-way Hash Chain and Revocation Polynomial-Based Self-Healing Group Key Distribution Schemes in Resource-Constrained Wireless Networks, Sensors 14 (12) (2014) 24358-24380.

SUMMARY

An object of the present invention is to provide a multi-party session key agreement method that can be applied to a blockchain network.

Another object of the present invention is to provide a session key agreement method with excellent economic efficiency, as well as complete forward secrecy of a session key for enhancing security of network communication.

To accomplish the above objects, according to one aspect of the present invention, there is provided a multi-party session key agreement method comprising a test session for exchanging a short-term key between parties of 3 to n peers;

and an original session for exchanging a long-term key between the parties who have exchanged the short-term key.

DETAILED DESCRIPTION

Hereinafter, the present invention will be described in more detail with reference to the accompanying drawings. However, the accompanying drawings are only examples for easily describing the content and scope of the technical spirit of the present invention, and the technical scope of the present invention is not limited or changed thereby. It will be natural for those skilled in the art that various modifications and changes are possible within the scope of the technical spirit of the present invention based on these examples.

The present invention is characterized in that the conventional key storage scheme is replaced with a session key agreement that follows a multilateral protocol, and the key exchange agreement among users is activated by the Federated Byzantine Agreement (FBA) protocol. Accordingly, the agreement method according to the present invention is a hybrid of the FBA and the forward secrecy.

The present invention having these characteristics relates to a multi-party session key agreement method configured of a test session for exchanging a short-term key between parties of 3 to n peers; and an original session for exchanging a long-term key between the parties who have exchanged the short-term key. In the present invention, a session is divided into a test session and an original session to enhance security. The test session is performed using a short-term key for simple security, which is a process of confirming low-level security. The original session is a process of confirming high-level security using a long-term key and an agreement key, which is a session in which an agreement mechanism of nodes participating in a network is conducted.

In a communication protocol, communication among three persons is interpreted as multi-party communication. Therefore, although the present invention describes a session between three or more parties, this will be simplified hereinafter to involve three parties in one peer since it will be very complicated when the present invention is explained for more than three parties. However, it will be natural that the multi-party session key agreement method of the present invention is possible even among four or more parties according to the concept and principles described in the present invention.

Figure 1A:
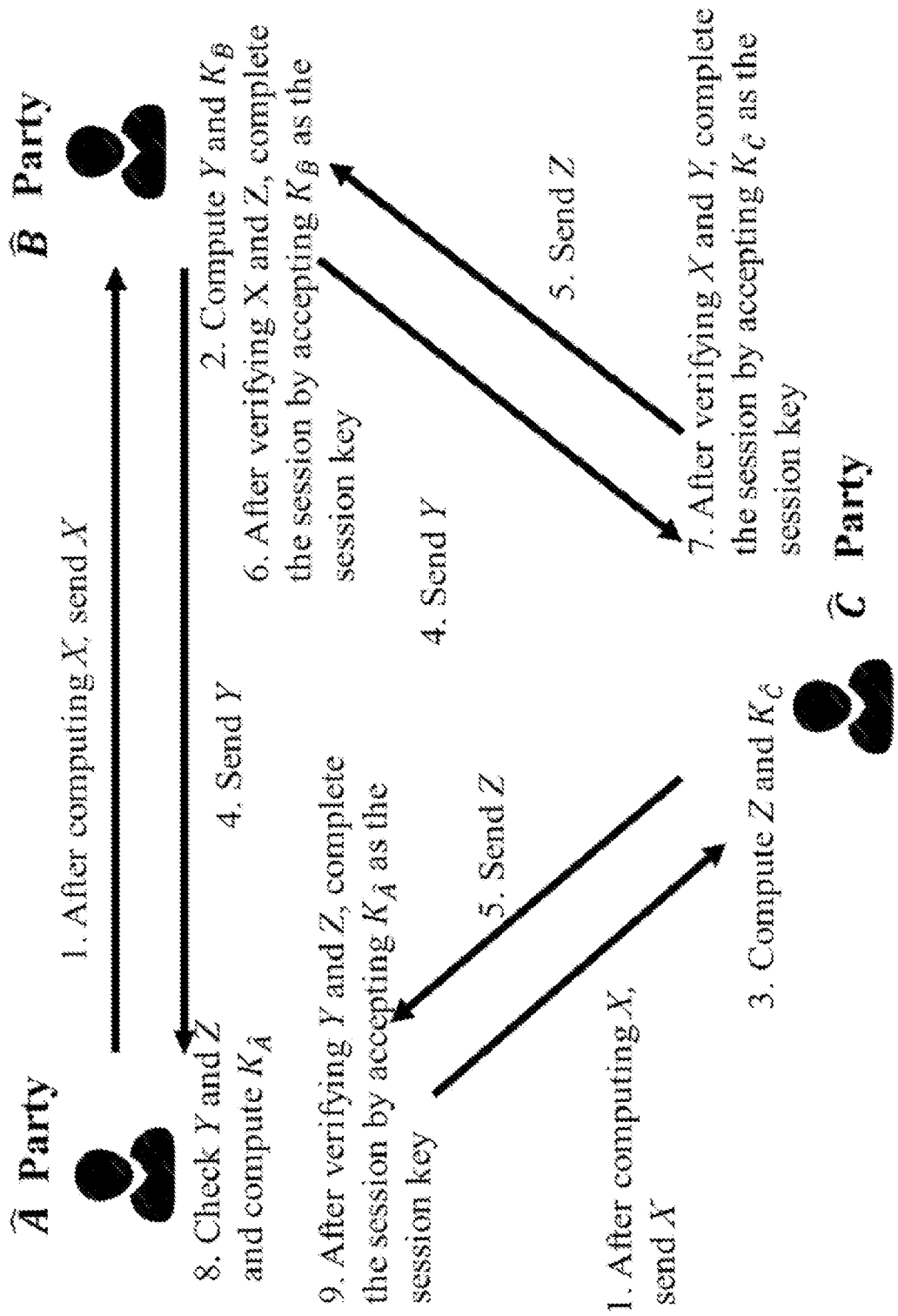
FIG. 1A is a view showing an exemplary procedure of a test session in an agreement method according to the present invention.

In the present invention, the test session may include following sub-steps. FIG. 1A shows an exemplary procedure of a test session in an agreement method according to the present invention.

That is, $\hat{A}$ possess a long-term key pair (a, A), $\hat{B}$ possess a long-term key pair (b, B), and $\hat{C}$ possess a long-term key pair (c, C), and the test session may include the sub-steps of: (a) activating session s=($\hat{A}$, i), selecting a short-term private key, calculating $X=g^{fR(r\hat{A},a,\Omega)}$, and sending X to $\hat{B}$ and $\hat{C}$ by $\hat{A}$; (b) activating session s=($\hat{B}$, i), selecting a short-term private key, and calculating $Y=g^{fR(r\hat{B},b,\Omega)}$ and $K_{\hat{B}}=F_R(f_R(r_{\hat{B}},b,\Omega),b,X,\Omega)$ by $\hat{B}$; (c) activating session s=($\hat{C}$, i), selecting a short-term private key, and calculating $Z=g^{fR(r\hat{C},c,\Omega)}$ and $K_{\hat{C}}=F_R(f_R(r\hat{C},c,\Omega),c,Y,\Omega)$ by $\hat{C}$; (d) sending Y to $\hat{A}$ by $\hat{B}$, and sending X and Y to $\hat{C}$ by $\hat{A}$; (e) sending X and Z to $\hat{B}$ by $\hat{C}$, and sending Y and Z to $\hat{A}$ by $\hat{B}$; (f) completing the session using session key $K_{\hat{B}}$ by $\hat{B}$ after confirming X; (g) completing the session using session key $K_{\hat{C}}$ by $\hat{C}$ after confirming Y; (h) calculating $K_{\hat{A}}=F_f(f_r(r\hat{A},a,\Omega),a,Y,\Omega)$ by $\hat{A}$ after confirming Y; (i) completing the session using session key $K_{\hat{A}}$ by $\hat{A}$ after confirming Z; and (j) confirming whether H(session key value+transaction session key tree root value)<TV (Target Value), and conducting the original session step if satisfied, and terminating the session if not satisfied, by $\hat{A}$, $\hat{B}$, and $\hat{C}$, respectively.

Here, the meaning of each abbreviation is summarized in Table 1, and i=1 . . . q is a query phase.

In the test session, session activation of each party may be simultaneously conducted in two or more among $\hat{A}$, $\hat{B}$, and $\hat{C}$, or the sessions may be activated sequentially in order of $\hat{A}$, $\hat{B}$, and $\hat{C}\hat{C}$.

TABLE 1

| Abbreviations | Descriptions |
| --- | --- |
| $\hat{A}$, $\hat{B}$, $\hat{C}$ | Party A, B, C |
| X, Y, Z | Short-term public keys of party A, B, C |
| r$\hat{A}$, r$\hat{B}$, r$\hat{C}$ | Short-term private keys of party A, B, C |
| $K_{\hat{A}}$, $K_{\hat{B}}$, $K_{\hat{C}}$ | Session keys of party A, B, C |
| A, B, C | Long-term public keys of party A, B, C ($A = g^a$), ($B = g^b$), ($C = g^c$) |
| a, b, c | Long-term private keys of party $\hat{A}$, $\hat{B}$, $\hat{C}$ (a $\in z_p$) |
| $pK_{\hat{A}}$, $pK_{\hat{B}}$, $pK_{\hat{C}}$ | Agreement public keys of party $\hat{A}$, $\hat{B}$, $\hat{C}$ |
| $sK_{\hat{A}}$, $sK_{\hat{B}}$, $sK_{\hat{C}}$ | Agreement private keys of party $\hat{A}$, $\hat{B}$, $\hat{C}$ |
| g | Generator |

At sub-step (j) of the test session, when $\hat{A}$, $\hat{B}$, and $\hat{C}\hat{C}$ respectively satisfy H(session key value+transaction session key tree root)<TV (Target Value), the original session is conducted.

Figure 1B:
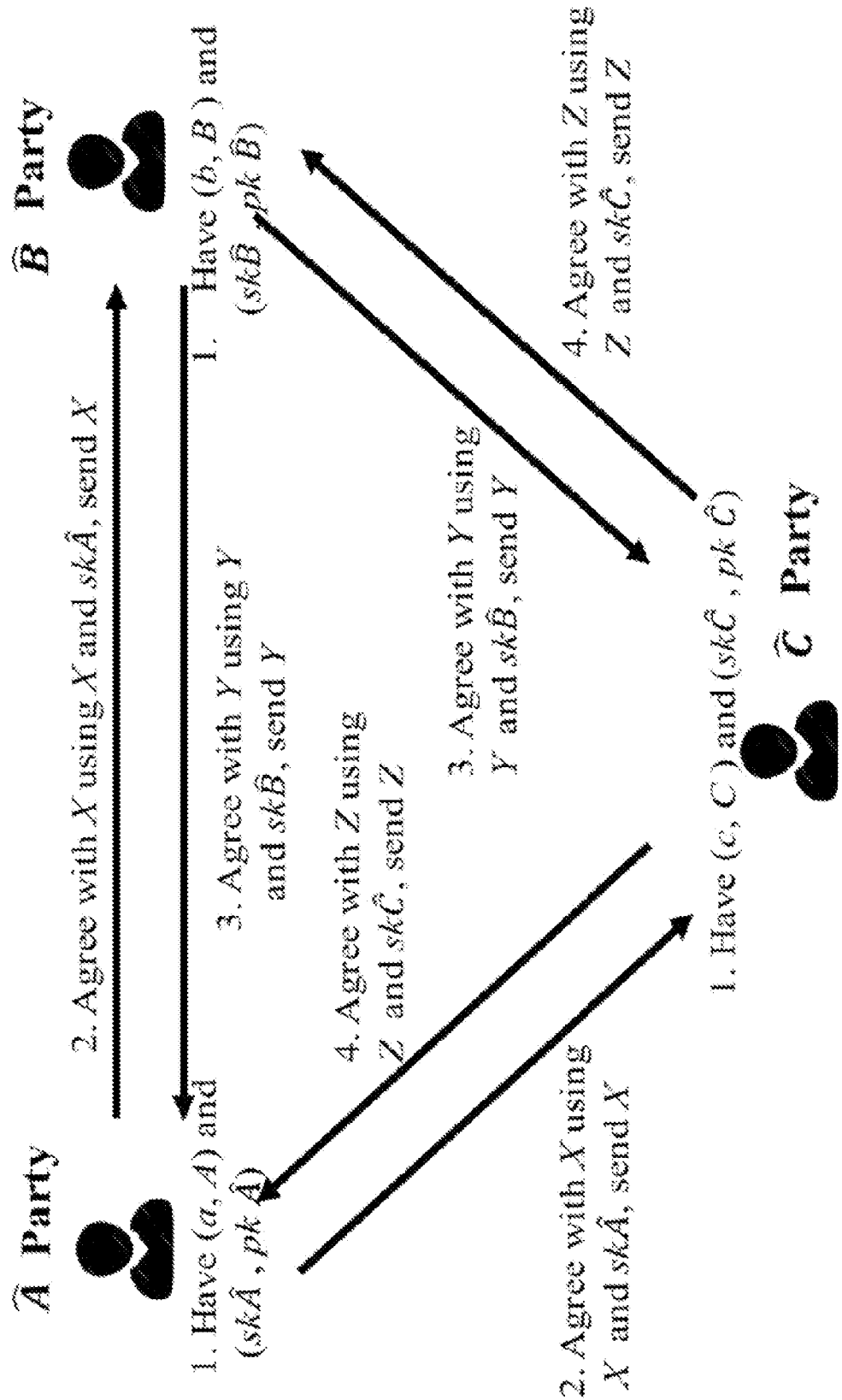
FIG. 1B is a view showing an exemplary procedure of an original session in an agreement method according to the present invention.

In the present invention, the original session may include following sub-steps. FIG. 1B shows an exemplary procedure of an original session in an agreement method according to the present invention.

That is, in the present invention, $\hat{A}$ possess an agreement key pair (pk$\hat{A}$, sk$\hat{A}$,), $\hat{B}$ possess an agreement key pair (pk$\hat{B}$, sk$\hat{B}$,), and $\hat{C}$ possess an agreement key pair (pk$\hat{C}$, sk$\hat{C}$,), and the original session may include the sub-steps of: (a) sending X to $\hat{B}\hat{B}$ and $\hat{C}$ by $\hat{A}$ after agreeing with X using sk$\hat{A}$; (b) sending Y to $\hat{A}$ and $\hat{C}$ by $\hat{B}$ after agreeing with Y using sk$\hat{B}$; and (c) sending Z to $\hat{A}$ and $\hat{B}$ by $\hat{C}$ after agreeing with Z using sk$\hat{C}$. (The meaning of each abbreviation is as shown in Table 1)

In the test session, when A arbitrarily sends X to potential parties in the peer, parties responding thereto are "B and C", and at this point, a person responding first is "B", and a person responding next is "C". When the two persons respond at the same time, a person is selected based on a predetermined criterion. Of course, when three or more persons respond, it will be natural that the process may be performed in a method corresponding to the above steps.

In the present invention, in order to further enhance security of the multi-party session key agreement method described above, it is preferable to encode the derived session keys in a blockchain data structure. For example, security information of a key protocol is added to the block body of the blockchain as a transaction session key tree root, and in one transaction, secret key information of a session is attached to the block body of the blockchain in correspondence to the Proof of Stake (PoS).

Figure 1C:
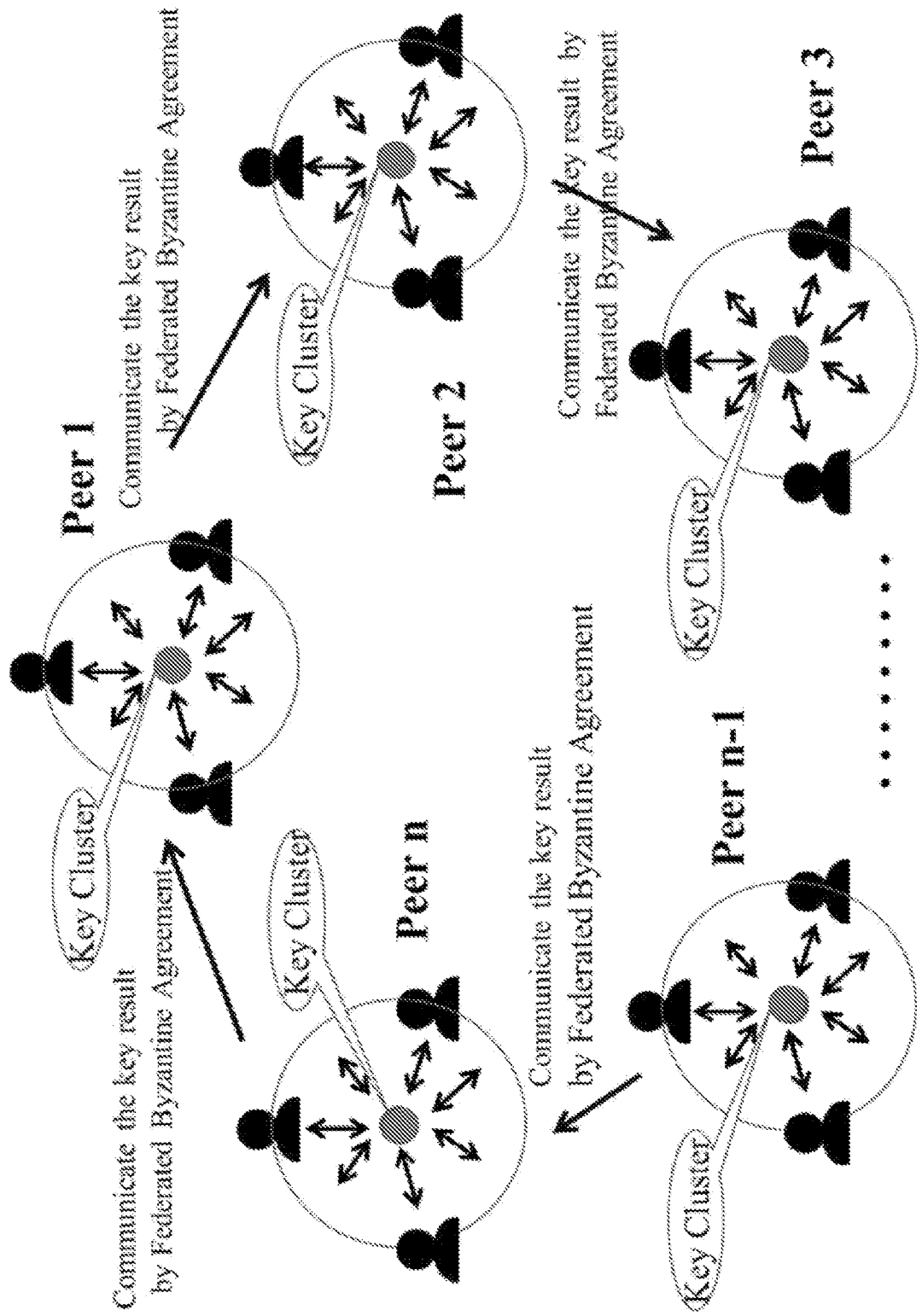
FIG. 1C is a view showing an exemplary procedure of a process of agreeing (exchanging) a session result generated by a peer with another peer in the present invention.

In the present invention, peer (n) that has conducted the test session and the original session has cluster (n) that manages the keys as a result of conducting the sessions, and it is preferable for cluster (n) to go through a process of agreeing (exchanging, transmitting) a result of a session conducted in peer (n) by communicating with cluster (n+1) of another peer (n+1). At this point, the agreement may be performed based on the Federation Byzantine Agreement (FBA). FIG. 1C shows an exemplary procedure of a process of agreeing (exchanging) a session result generated by a peer with another peer. As shown in FIG. 1C, after a key cluster in a peer processes session keys for all users in the peer, it transmits secrete key information of its peer to the key cluster in another peer. This transfer process is repeated for all peers.

According to the present invention as described above, since the session result of cluster (n), in which the session key agreement is preceded, affects the session key agreement process of another cluster (n), in which the session key agreement is followed, and an inverse affect does not occur, forward secrecy is guaranteed.

When the multi-party session key agreement method according to the present invention is used, a method of enhancing security of a cryptocurrency wallet in a cryptocurrency transaction, a method of enhancing security of a cryptocurrency wallet in a blockchain game, or the like will be possible. For example, Play to Earn (P2E) is a concept that 'makes money while playing games', which is one of blockchain game methods that allows a user to exchange items acquired while playing games for cryptocurrencies, NFTs, or the like, and convert the items into cash through a virtual asset exchange. When the multi-party session key agreement method according to the present invention is introduced in a P2E game, legitimate ownership on the items, cryptocurrencies, NFTs, coins, and the like acquired by the user may be acknowledged, and although game developers disappear, the user may prove his or her ownership.

The security and efficiency of the multi-party session key agreement method according to the present invention as described above has been analyzed.

1. Analysis of Security

Security analysis assumes botnet attacks on peer-to-peer users. A botnet may be defined as a network of compromised computers that can be remotely controlled by an attacker. System simulation assumes that a system state is represented through the messages transmitted between processes, and only the interacting processes that generate global de-synchronization may use these messages.

Figure 2:
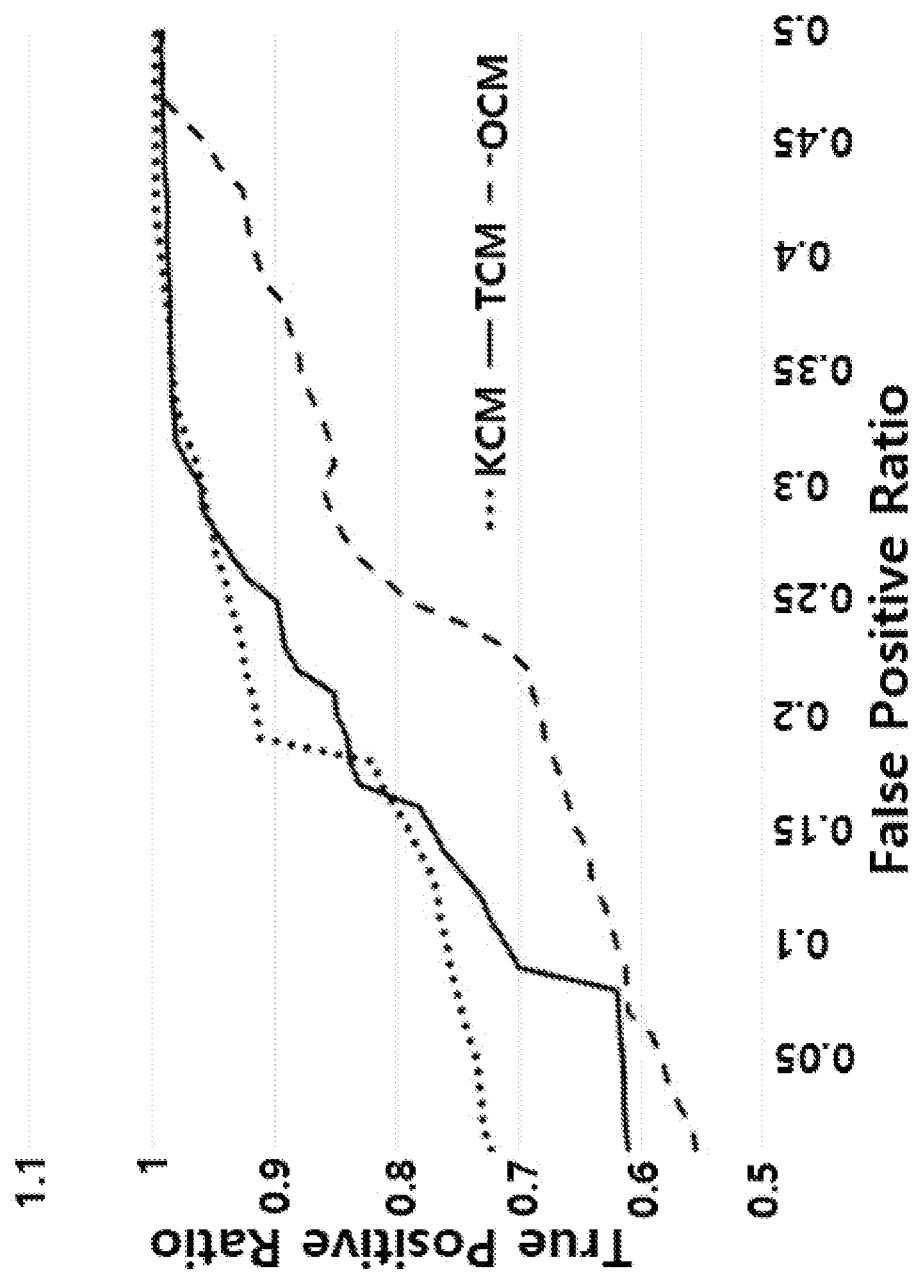
FIG. 2 is a graph showing a result of evaluating an F-measure model of an agreement method according to the present invention.

In the present invention, OverSim, which is an open-source overlay and P2P network simulation framework for the OMNeT++ simulation environment, is used to make understanding of the P2P protocol source code easy. In order to analyze the botnet behavior, a simulation obtained from OverSim according to the method disclosed in Reference 1 is used, and it is applied to the F-measure model. A graph showing a result of evaluating the F-measure model for the multi-party session key agreement method according to the present invention is attached in FIG. 2.

In the ROC curve of the drawing, values of Key Cluster Mode (KCM), Test Session Key Mode (TSM), and Original Session Key Mode (OSM) have a True Positive Ratio (TPR) of 0.5 or more and a False Positive Ratio (FPR) of 0.5 or less. Therefore, it is proved that the multi-party session key agreement method model according to the present invention secures optimal security.

2. Analysis of Computation Efficiency

For comparison of computation cost, the experimental environment presented in Reference 1 is followed. 32 bits are used for the timestamp, arbitrary value, and sequence number, and 1024 bits are used for the session key.

Table 2 shows a result of comparison with four prior technologies studied in relation to enhancement of computation efficiency.

In the table, $T_h$ is a one-way hash function, $T_{ecm}$ is ECC point multiplication, $T_{eca}$ is ECC point addition, 5 $T_{senc}$ is symmetric encryption, $T_{sdec}$ is symmetric decryption, and $T_{me}$ is modular exponentiation.

TABLE 2

| Comparison group | Computation cost |
| --- | --- |
| Embodiment | $9\,T_{me} + 4\,T_{ecm} + T_{eca} + 9\,T_h +$ |
| Comparative example 1 | $11\,T_{me} + 3\,T_{ecm} + 2\,T_{eca} + 5\,T_{senc}/T_{sdec}$ |
| Comparative example 2 | $12\,T_{me} + 4\,T_{senc}/T_{sdec}$ |
| Comparative example 3 | $13\,T_{me} + 6\,T_{ecm} + 2\,T_{eca} + 6\,T_{senc}/T_{sdec}$ |
| Comparative example 4 | $13\,T_h + 10\,T_{me} + 8\,T_{senc}/T_{sdec}$ |

In Comparative Example 1, a digital signature key computation is required to verify only participating users. Since the key can be confirmed by the Diffie-Hellman calculation, it takes time longer than the mutual authentication using the Diffie-Hellman group key verification of Comparative Example 2.

In Comparative Example 2, although the group key authentication cost is efficient, it is not suitable for a blockchain that stores transaction history and needs to prove works.

Comparative Example 3 requires polynomial reduction of key size according to the number of mutual authentications of signers, and it is inefficient from the aspect of computation cost, as well as security, due to the combination of polynomial time and key size for a blind signature.

In Comparative Example 4, although a key based on pairing is formed for efficiency of the public key, there is a limitation in a practical application as it is theoretical. In addition, a secrete key algorithm cannot be arbitrarily generated, and a public key cannot be processed. In addition, since an arbitrary private key generation algorithm is generally included in Comparative Example 4, there is a problem in that the backward operation is difficult.

Although a specific computation cost is not compared in Table 2, a technique proposed in Comparative Example 5, which is another prior literature, has a small set and many parties from the aspect of a given runtime, so that the computation and communication complexity is linear to the number of elements in the largest set given by a fixed number of collusive parties. Although the protocol described above is a fast tool for personal computing, it does not desal with security proof in an extended distributed network as safety is proved in a semi-honest way by setting an intersection protocol at both regular and critical intersections.

Contrarily, the protocol according to the present invention is a safe multilateral protocol and is effective for distributed networks that utilize a blockchain.

According to the present invention as described above, primarily, low-level security is secured with a short-term key pair by the test session, and security unfiltered in the test session is conducted in the original session with an agreement key pair at a higher-level security of a long-term key pair. A key result processed in this way guarantees correct transaction records of participating parties through an agreement mechanism using the Federated Byzantine Agreement.

Therefore, according to the present invention, as a session key protocol with excellent economic efficiency, as well as complete forward secrecy of a session key for enhancing security, is possible, security in normal communication can be secured, and as the key of a cryptocurrency wallet is protected and authenticity of cryptocurrency transaction records is guaranteed at the same time, it may greatly contribute to prevention of cryptocurrency hacking.

In addition, the present invention can be widely used in other areas since it guarantees a safe distributed network, as well as cryptocurrency protection. For example, as the agreement method according to the present invention is applied to blockchain games and P2E (play to earn), security in the process of trading cryptocurrencies, NFTs, items, or the like among game users is enhanced, and thus reliability and safety can be guaranteed.

(Reference 1) www.oversim.org/.

(Comparative example 1) M. Just, S. Vaudenay, Authenticated multi-party key agreement, in: Proc. of Asiacrypt'96, in: LNCS 1163, Springer, 1997, pp. 36-49.

(Comparative example 2) E. Bresson, O. Chevassut, D. Pointcheval, Provably authenticated group diffie-hellman key exchange-the dynamic case, in: Proc. of Asiacrypt'01, in: LNCS 2248, Springer, 2001, pp. 255-264.

(Comparative example 3) D. Pointcheval, J. Stern, Security arguments for digital signaturesand blind signatures, J. Cryptol. 13 (3) (2000) 361-396.

(Comparative example 4) H. Chen, L. Xie, Improved One-way Hash Chain and Revocation Polynomial-Based Self-Healing Group Key Distribution Schemes in Resource-Constrained Wireless Networks, Sensors 14 (12) (2014) 24358-24380.

(Comparative example 5) Asli Bay et al., Practical Multi-Party Private Set Intersection Protocols, IEEE TRANSACTIONS ON INFORMATION FORENSICS AND SECURITY, VOL. 17, 2022

What is claimed is:

1. A multi-party session key agreement method comprising:
   a test session for exchanging a short-term key between parties of 3 to n peers; and
   an original session for exchanging a long-term key between the parties who have exchanged the short-term key,
   wherein $\hat{A}$ possess a long-term key pair (a, A), $\hat{B}$ possess a long-term key pair (b, B), and $\hat{C}$ possess a long-term key pair (c, C), and the test session includes the sub-steps of:
   (a) activating session $s=(\hat{A}, i)$, selecting a short-term private key, calculating $X=g^{f_H(r\hat{A},a,\Omega)}$, and sending X to $\hat{B}$ and $\hat{C}$ by $\hat{A}$;
   (b) activating session $s=(\hat{B}, i)$, selecting a short-term private key, and calculating $Y=g^{f_R(r\hat{B},b,\Omega)}$ and $K_{\hat{B}}=F_R(f_R(r_{\hat{B}},b,\Omega),b,X,\Omega)$ by $\hat{B}$;
   (c) activating session $s=(\hat{C}, i)$, selecting a short-term private key, and calculating $Z=g^{f_R(r\hat{C},c,\Omega)}$ and $K_{\hat{C}}=F_R(f_R(r_{\hat{C}},c,\Omega),c,Y,\Omega)$ by $\hat{C}$;
   (d) sending Y to $\hat{A}$ by $\hat{B}$, and sending X and Y to $\hat{C}$ by $\hat{A}$;
   (e) sending X and Z to $\hat{B}$ by $\hat{C}$, and sending Y and Z to $\hat{A}$ by $\hat{B}$;
   (f) completing the session using session key $K_{\hat{B}}$ by $\hat{B}$ after confirming X;
   (g) completing the session using session key $K_{\hat{C}}$ by $\hat{C}$ after confirming Y;
   (h) calculating $K_{\hat{A}}=F_f(f_f(r_{\hat{A}},a,\Omega),a,Y,\Omega)$ by $\hat{A}$ after confirming Y;
   (i) completing the session using session key $K_{\hat{A}}$ by $\hat{A}$ after confirming Z; and
   (j) confirming whether H(session key value+transaction session key tree root value)<TV (Target Value), and conducting the original session step if satisfied, and terminating the session if not satisfied, by $\hat{A}$, $\hat{B}$, and $\hat{C}$, respectively,
   where $\hat{A}$, $\hat{B}$, and $\hat{C}$ are party A, B, C respectively, where X, Y, and Z are short-termed public keys of the party A, B, and C respectively, where r$\hat{A}$, r$\hat{B}$, and r$\hat{C}$ are short-term private keys of party A, B, C and respectively, where $K_{\hat{A}}$, $K_{\hat{B}}$, and $K_{\hat{C}}$ are session keys of party A, B, and C respectively, where A, B, and C are long-term public keys of party A, B, and $C(A=g^a)$, $(B=g^b)$, and $(C=g^c)$ respectively, where a, b, are c are long-term private keys of party $\hat{A}$,$\hat{B}$, and $\hat{C}$ ($a \in z_p$) respectively, where $pK_{\hat{A}}$, $pK_{\hat{B}}$, and $pK_{\hat{C}}$ are agreement public keys of party $\hat{A}$,$\hat{B}$, and $\hat{C}$ respectively, where $sK_{\hat{A}}$, $sK_{\hat{B}}$, and $sK_{\hat{C}}$ are agreement private keys of party $\hat{A}$,$\hat{B}$, and $\hat{C}$ respectively, and, where g is a generator.

2. The method according to claim 1, wherein $\hat{A}$ possess an agreement key pair (pk$\hat{A}$, sk$\hat{A}$,), $\hat{B}$ possess an agreement key pair (pk$\hat{B}$, sk$\hat{B}$,), and $\hat{C}$ possess an agreement key pair (pk$\hat{C}$, sk$\hat{C}$,), and the original session includes the sub-steps of:
   (a) sending X to $\hat{B}\hat{B}$ and $\hat{C}$ by $\hat{A}$ after agreeing with X using sk$\hat{A}$;
   (b) sending Y to $\hat{A}$ and $\hat{C}$ by $\hat{B}$ after agreeing with Y using sk$\hat{B}$; and
   (c) sending Z to $\hat{A}$ and $\hat{B}$ by $\hat{C}$ after agreeing with Z using sk$\hat{C}$.

3. The method according to claim 1, wherein peer (n) that has conducted the test session and the original session has cluster (n) that manages the keys as a result of conducting the sessions, and cluster (n) agrees with a result of the session conducted in peer (n) by communicating with cluster (n+1) of another peer (n+1).

4. The method according to claim 3, wherein the agreement is performed based on the Federation Byzantine Agreement (FBA).

5. A security method of a cryptocurrency wallet when a cryptocurrency is traded using the multi-party session key agreement method of claim 1.

6. A cryptocurrency wallet security method in a blockchain game using the multi-party session key agreement method of claim 1.

* * * * *